US006148660A

United States Patent [19]

Chiu et al.

[11] Patent Number: 6,148,660

[45] Date of Patent: Nov. 21, 2000

[54] GLOW SENSOR-CERAMIC TIP

[75] Inventors: Randolph Kwok-Kin Chiu; Charles Dale Oakley, both of Davison; Russell Harmon Bosch, Gaines, all of Mich.; Magnus Glavmo, Luxembourg, Luxembourg; Hiroshi Takayama; Keisuke Okajima, both of Tokyo, Japan

[73] Assignee: General Motors Corporation, Detroit, Mich.

[21] Appl. No.: 09/160,396

[22] Filed: Sep. 25, 1998

[51] Int. Cl.[7] .......................... G01M 15/00; F02M 39/00

[52] U.S. Cl. .......................... 73/35.08; 73/116; 324/378; 324/402; 324/459

[58] Field of Search .............................. 73/35.01, 35.03, 73/35.06, 35.08, 116, 117.2, 117.3; 324/378, 402, 459, 460, 464, 465, 468

[56] References Cited

U.S. PATENT DOCUMENTS

| | | | |
|---|---|---|---|
| 4,307,603 | 12/1981 | Dobler et al. | 73/35.08 |
| 4,377,140 | 3/1983 | Latsch | 123/425 |
| 4,463,729 | 8/1984 | Bullis et al. | 123/478 |
| 4,739,731 | 4/1988 | Habich et al. | 123/494 |
| 4,760,830 | 8/1988 | Bullis et al. | 73/117.3 |
| 5,734,094 | 3/1998 | Matsubara et al. | 73/35.08 |
| 5,834,629 | 11/1998 | Hammarberg | 73/35.08 |
| 5,893,993 | 4/1999 | Kurano | 219/270 |
| 5,922,229 | 7/1999 | Kurano | 219/270 |

FOREIGN PATENT DOCUMENTS

| | | |
|---|---|---|
| 19737396A1 | 3/1998 | Germany . |
| 19738915A1 | 3/1998 | Germany . |
| WO97/38223 | 10/1997 | WIPO . |

*Primary Examiner*—George Dombroske
*Attorney, Agent, or Firm*—Vincent A. Cichosz

[57] ABSTRACT

A glow sensor which combines functions of a diesel engine glow plug with an ion sensor for sensing engine combustion initiation and characteristics includes a ceramic rod retained in a supporting ceramic sleeve carried by a metal shell mountable in an engine cylinder head. The ceramic rod includes a heating element in a glow tip at the inner end of the rod which, in use, extends into an engine combustion chamber or pre-chamber. A conductive material such as platinum or palladium is coated on the lower end of the glow tip and connected by a conductor with a source of electric voltage. In use, the voltage produces a current carried by electrons generated by ionization of the combustion chamber gases during combustion. The current varies with the degree of ionization and the amount of electrons generated during various phases of the combustion event. The resulting information is usable in controlling engine operation or evaluating its operation for test purposes. Various construction features of disclosed embodiments include an internal conductor through the ceramic rod from the platinum or palladium material to a lead or an external conductor applied on the surface of the ceramic rod with which an insulating ceramic sleeve is utilized to mount the rod within its supporting shell. Grounding connections through an additional lead from the outer end of the ceramic rod or via metallic connections through the ceramic sleeve to the shell are alternatively disclosed.

10 Claims, 3 Drawing Sheets

GLOW SENSOR-CERAMIC TIP

TECHNICAL FIELD

This invention relates to diesel engines and, more particularly, to glow sensors which combine functions of both a glow plug and an ion sensor to promote fuel ignition in an engine combustion chamber during starting and low temperature running and to sense the occurrence and character of combustion events.

BACKGROUND OF THE INVENTION

It is known in the art relating to diesel engines to provide an ignition glow plug having a heated glow tip which extends into the engine combustion chamber or precombustion pre-chamber to promote ignition of fuel, especially during starting and low temperature operation. It is also known in internal combustion engines to provide an ion sensor in the combustion chamber which senses the occurrence of combustion events through variations in current flow across a gap through combustion gases in the chamber. The combination of a ceramic glow plug tip combined with an ion sensor for use in a diesel engine has also been proposed.

SUMMARY OF THE INVENTION

The present invention provides unique and specific embodiments of glow sensors intended for use in diesel engines and combining the functions of both glow plugs and ion sensors. In particular this invention provides various embodiments of glow sensors, each having a ceramic rod with a heated glow tip combined with a conductive layer on the tip for use as the ion sensor. Means are also provided for supporting and electrically connecting the electrical elements within the glow sensor. For convenience, the term "glow sensor" as used herein should be understood to refer to devices for carrying out the functions of both a glow plug and an ion sensor as described herein.

In general, a device according to the invention may be defined as a glow sensor for use in a combustion chamber of a diesel engine, the glow sensor having a tubular metal shell including mounting means for mounting the glow sensor in a chamber defining component of the engine; a ceramic support sleeve carried in the shell; a ceramic rod carried by the support sleeve and having an outer end terminating within the shell and isolated therefrom by the sleeve, and an inner end forming a glow tip extending inwardly beyond the shell and sleeve for extension into an associated combustion chamber; a heating element within the glow tip and connected with first and second electrical conductors within the ceramic rod for providing electric current to the heating element; an electrically conductive layer on the glow tip and connected with a third electrical conductor for providing electric voltage to the conductive layer; and connecting means for connecting the conductors to electrical sources exterior to the glow sensor.

These and other features and advantages of the invention will be more fully understood from the following description of certain specific embodiments of the invention taken together with the accompanying drawings.

DESCRIPTION OF THE PRIOR ART

Figure 1:
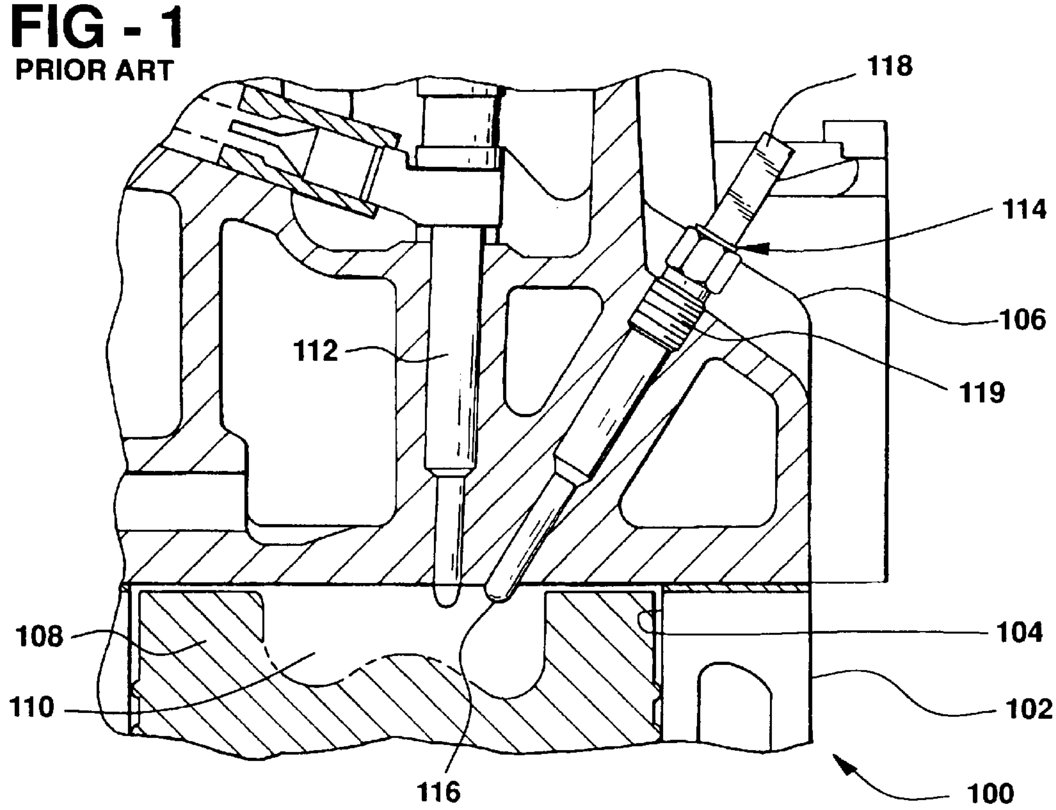
FIG - 1 PRIOR ART
FIG. 1 is a fragmentary cross-sectional view of an open chamber diesel engine having direct injection of fuel into the combustion chamber and a prior art glow plug with a glow tip extending into the chamber.
Figure 2:
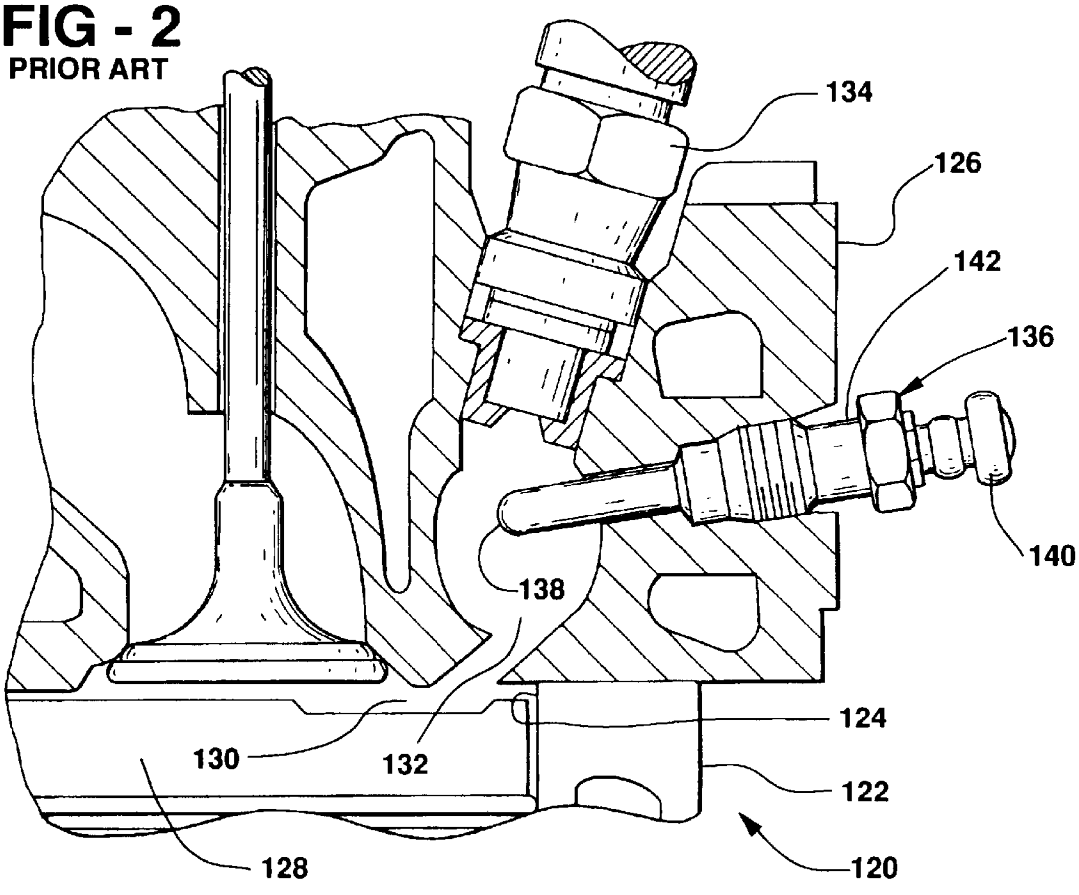
FIG - 2 PRIOR ART
FIG. 2 is a fragmentary cross-sectional view of a pre-chamber type diesel engine having indirect fuel injection into the pre-chamber and a prior art glow plug with a glow tip extending into the pre-chamber.

Referring first to FIGS. 1 and 2 of the drawings in detail, there are shown examples of prior art applications of diesel engine glow plugs to both open chamber and pre-chamber type diesel engines. While these applications utilize glow plugs of the type having a glow tip formed within a metal sheath, the use of ceramic rods in place of the metal sheath type glow plugs is well known.

In FIG. 1, numeral 100 generally indicates an open chamber type diesel engine having a cylinder block 102 defining a cylinder 104 closed by a cylinder head 106. A piston 108 is reciprocable in the cylinder 104 and defines a recessed bowl which, together with the cylinder head, forms a combustion chamber 110. The cylinder head mounts an injection nozzle or injector 112 which sprays fuel into the combustion chamber 110 for compression ignition therein. The cylinder head also mounts a glow plug 114 having a glow tip 116 extending into the combustion chamber. The glow tip is heated during cold engine starting and low temperature operation to assist in igniting fuel sprayed into the combustion chamber during periods when the temperature of compression may be insufficient to provide for proper fuel ignition and combustion.

The illustrated glow plug 114 is of the type having a metallic sheath forming the glow tip. However, the use of ceramic glow tips is also well known. A terminal 118 is provided at the outer end of the glow plug for connection with a source of electric current. Return current flow is from the metal sheath of the glow tip to a metal shell 119 of the glow plug and to the cylinder head in which the shell is mounted and which is grounded to the electrical system.

Referring to FIG. 2, numeral 120 indicates a pre-chamber type diesel engine having a cylinder block 122 with a cylinder 124 closed by a cylinder head 126 and carrying a piston 128 reciprocable in the cylinder. The piston and cylinder head form a combustion chamber 130 which connects with a pre-combustion chamber or pre-chamber 132 within the cylinder head. A fuel injector 134 is mounted in the cylinder head for injecting fuel into the pre-chamber and a glow plug 136 has a glow tip 138 extending into the pre-chamber to assist in igniting the fuel during starting and cold operation. A terminal 140 at the other end of the glow plug provides for connection to a source of electric current and the glow plug shell 142 is grounded to the cylinder head for completing the return current flow path as in the first described embodiment.

DESCRIPTION OF THE PREFERRED EMBODIMENTS

The present invention provides novel glow sensors which may be installed in diesel engines of the types previously described. These glow sensors provide both the prior glow plug functions of assisting in the ignition of the fuel during cold starting and operation and the additional ion sensor function of sensing the occurrence and character of combustion events in the combustion chamber or pre-chamber through the variations in ionization of combustion gases within the chamber during combustion in accordance with and for purposes that are known in the art. The terms "inner end" and "outer end" as used in the subsequent description and claims refer to directions in the glow sensor as installed in an engine wherein the glow tip forms an inner end extending within a combustion chamber (including a pre-chamber) and electrical terminals are located at an outer end extending outside the engine cylinder head.

Figure 3:
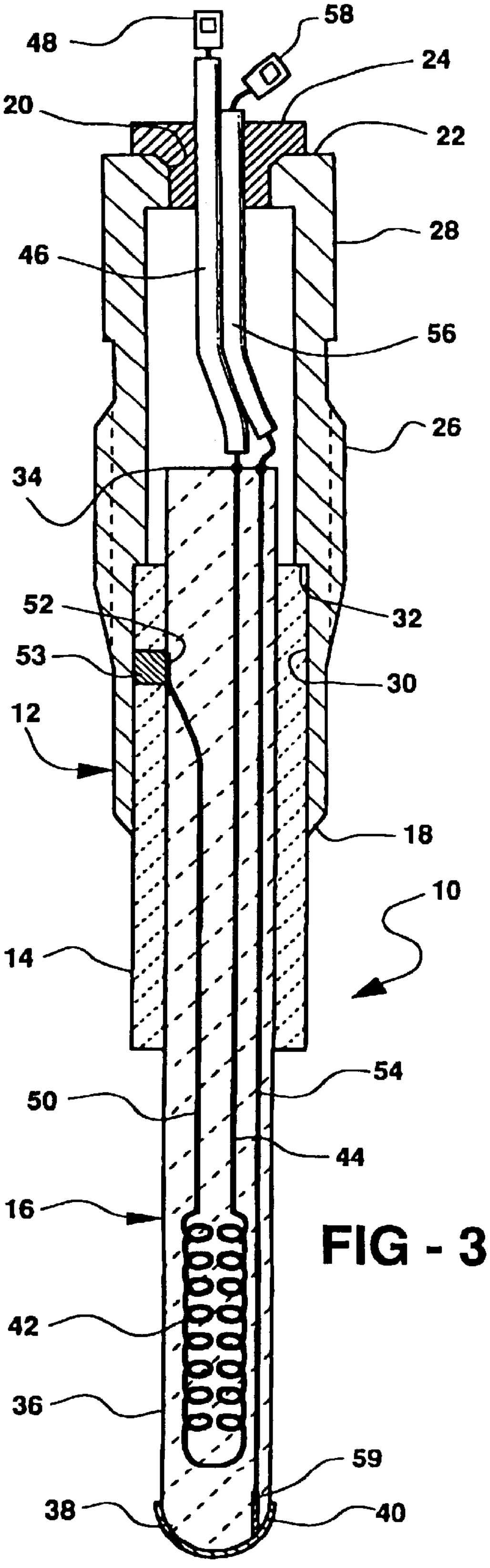
FIG. 3 is a cross-sectional view of a first embodiment of glow sensor formed according to the invention.

Referring now to FIG. 3 of the drawings, numeral 10 indicates a first embodiment of glow sensor formed in accordance with the invention. The glow sensor 10 combines the features of an ignition glow plug and a combustion chamber ion sensor in a single device having the general appearance of a glow plug and able to be installed in an engine in the cylinder head opening commonly provided for a glow plug.

Glow sensor 10 is constructed with a metal shell 12 having a hollow interior, into an inner end of which is inserted a ceramic sleeve 14 that in turn carries a ceramic rod 16.

The shell 12 is generally tubular, being open at an inner end 18 and having at an outer end 22 a smaller opening 20 closed by a seal 24 such as a plastic or rubber plug. External threads 26 are provided intermediate the ends of the body and a hexagonal head 28 is formed on the outer end 22 for securing the glow sensor in a threaded opening in an associated cylinder head of an engine, such as engine 100 shown in FIG. 1.

The interior of the inner end of the shell 12 is formed with an enlarged bore 30 into which the ceramic sleeve 14 is inserted until the ceramic rod 16 reaches the desired extension from the shell as the sleeve approaches a shoulder 32. The shell 12 may be made of alloy steel or other suitable metal which is sufficiently strong and electrically conductive as well as capable of being used at the temperatures reached within the cylinder head and adjacent combustion chamber during operation.

The ceramic rod may be made of silicon nitride ($Si_3N_4$), aluminum nitride (AIN) or another suitable high temperature insulator and is formed with an outer end 34 that extends beyond the outer end of the sleeve 14 into the hollow interior of the shell 12. An inner end 36 of the rod 16 extends well below the lower end of the sleeve 14 and may have a rounded or hemispherical tip 38 on which is coated a high temperature conductive material 40 such as platinum or palladium.

A portion of the inner end 36 of the ceramic rod generally adjacent to the tip 38 forms a glow tip within which there is located a heating element 42. Any suitable form of heating element usable in ceramic glow plugs may be used for this purpose. In the illustrated example, the heating element is formed from coils of tungsten wire molded within the ceramic rod 16. One end of the heating element 42 is connected with a first conductor 44 that extends from the element 42 out through the outer end 34 of the ceramic rod and into the hollow outer portion of the shell. There, conductor 44 is connected with an insulated first lead 46 that extends through the seal 24 to an external first terminal 48 connectable with a source of electric voltage. The other end of the heating element 42 is connected with a second conductor 50 which extends from the heating element 42 outward in the ceramic rod 16 to a terminus 52 at the side of the rod, where it is grounded, or connected electrically to the metal shell 12 through a conductor such as brazing material 53 disposed in the ceramic sleeve 14. Thus, an electrical ground connection is formed from the heating element 42 through the material 53 and shell 12 to the associated cylinder head of an engine in which the glow sensor is installed.

The conductive material 40 at the tip 38 of the glow sensor is electrically connected with a third electrical conductor 54 that extends near the tip 38 through the ceramic rod 16 and out its outer end 34 into the hollow interior of the shell 12. There, conductor 54 is connected with a third insulated lead 56 that extends out through the seal 24 to a third terminal 58 which is also connectable with a source of electric voltage. The electrical conductors 44, 50, 54 within the ceramic rod are preferably formed of tungsten wire for its high temperature resistance but may be formed of any other suitable high temperature conductive material if desired. Preferably, the tungsten wire 54 is connected with the platinum or palladium material 40 by a short length 59 of platinum or palladium wire or dried ink to prevent oxidation of the tungsten by exposure to combustion chamber gases.

In manufacture, the ceramic rod 16 is molded around the heating element 42 and electrical conductors 44, 50, 54 and the platinum or palladium conductor 40 is formed on the lower tip 38 by the application of platinum ink or the like printed on the tip surface. The ceramic rod 16 is inserted within the ceramic sleeve 14 and these two elements are fixed together, such as by brazing in a furnace. This assembly is then inserted into a preformed shell 12 until the sleeve 14 is near the shoulder 32 within the shell and the glow tip 38 has reached the desired extension from the shell. The sleeve 12 and shell 14 are then fixed together by metallic brazing which connects the third conductor electrically with the shell 12 through the brazing material 53 in an opening through sleeve 14 to form the electrical ground previously described. Leads 46 and 56 may be attached after furnace brazing and the seal 24 is then installed. Any other suitable form of assembly may also be used if desired. The brazing steps are preferably accomplished in a furnace and, if desired, could be done after assembly of all three elements together rather than in two steps as previously indicated.

In operation, the glow sensor 10 is installed in an engine, such as engine 100 shown in FIG. 1, in place of the glow plug 114. When the engine is started or otherwise requires ignition assistance during cold operation, an electric voltage is applied across the heating element 42 which causes the ceramic glow tip to be heated to a high temperature capable of igniting diesel fuel sprayed into the combustion chamber of the associated engine. The operation of this aspect of the glow sensor is identical to that of a conventional glow plug.

During engine operation, a controlled voltage is also applied through terminal 58 and conductor 54 to the conductive platinum or palladium coated on the glow tip 38 of the ceramic rod. The initiation of combustion in the combustion chamber creates electrons due to ionization of the fuel-air mixture so that a small electric current is conducted through the gap between the conductive material 40 and the closest adjacent portion of the engine. During the beginning of combustion in the engine of FIG. 1, an adjacent portion of the piston 108 is probably closest to the conductive material 40 of the glow tip 38. The flow of current across this gap may be measured by suitable measuring equipment so as to indicate the intensity of ionization occurring within the combustion chamber. This in turn indicates the initiation and variations in the combustion event within the cylinder so that the timing and manner of combustion within the cylinder may be read by an experienced operator or by control equipment for the purposes of controlling the engine fuel rate operating variables.

Figure 4:
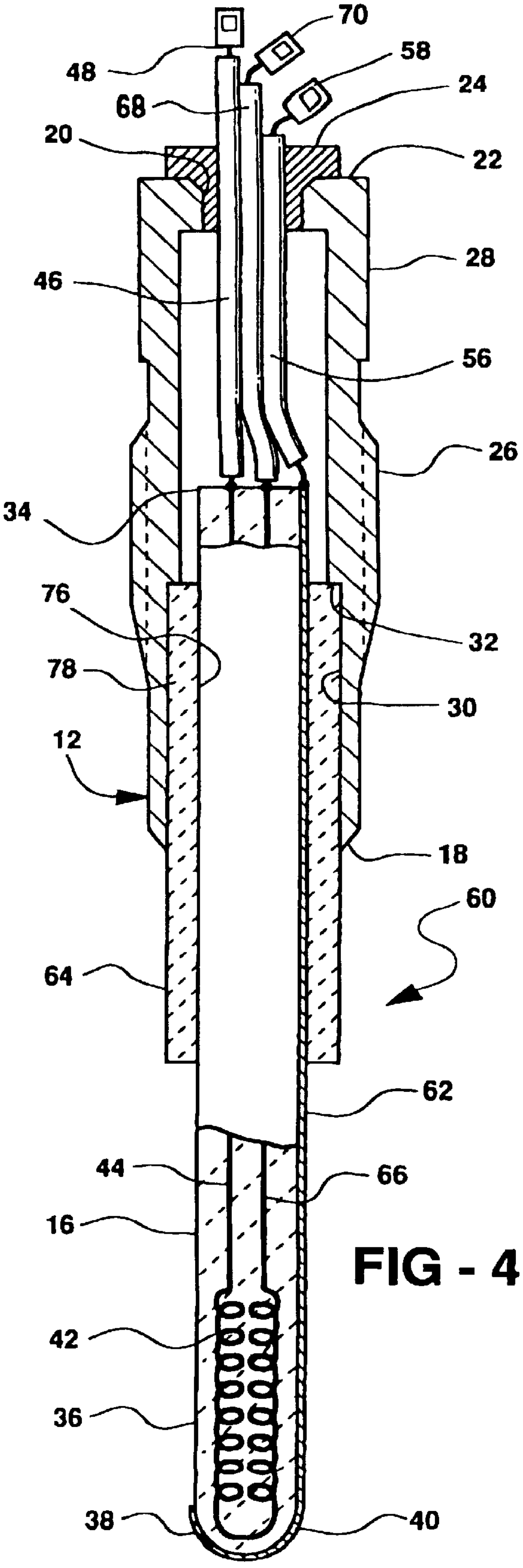
FIGS. 4 and 5 are cross-sectional views of alternative second and third embodiments of glow sensors formed according to the invention.

Referring now to FIG. 4, there is shown an alternative embodiment of ceramic glow sensor generally indicated by numeral 60. Glow sensor 60 is constructed of basically similar elements to those described with respect to the first embodiment illustrated in FIG. 3. It differs however in that the platinum or palladium conductive material 40 is connected with the third lead 56 by a platinum or palladium conductive stripe 62 applied on the outside of the ceramic rod 16 and extending from the conductive material 40 on the glow tip 38 to the outer end 34 of the ceramic rod. Conductor 62 is insulated from the shell 12 by an insulating ceramic sleeve 64 similar to that used in the previously described embodiment. The manner of construction is similar, in that the ceramic rod, sleeve, and shell may be furnace brazed together or retained in any other suitable manner, such as by a high temperature adhesive.

An additional difference in the construction is that the second or ground conductor 66 extends from the heating element 42 within the ceramic glow tip outward through the ceramic rod to its outer end 34 where this second conductor is connected with a second lead 68 that connects with a terminal 70 for external connection to a source of ground in the electrical system. Since the other aspects of the construction of glow sensor 60 are similar to that of the embodiment previously described, like numerals are utilized for like parts and further description is not believed necessary.

Figure 5:
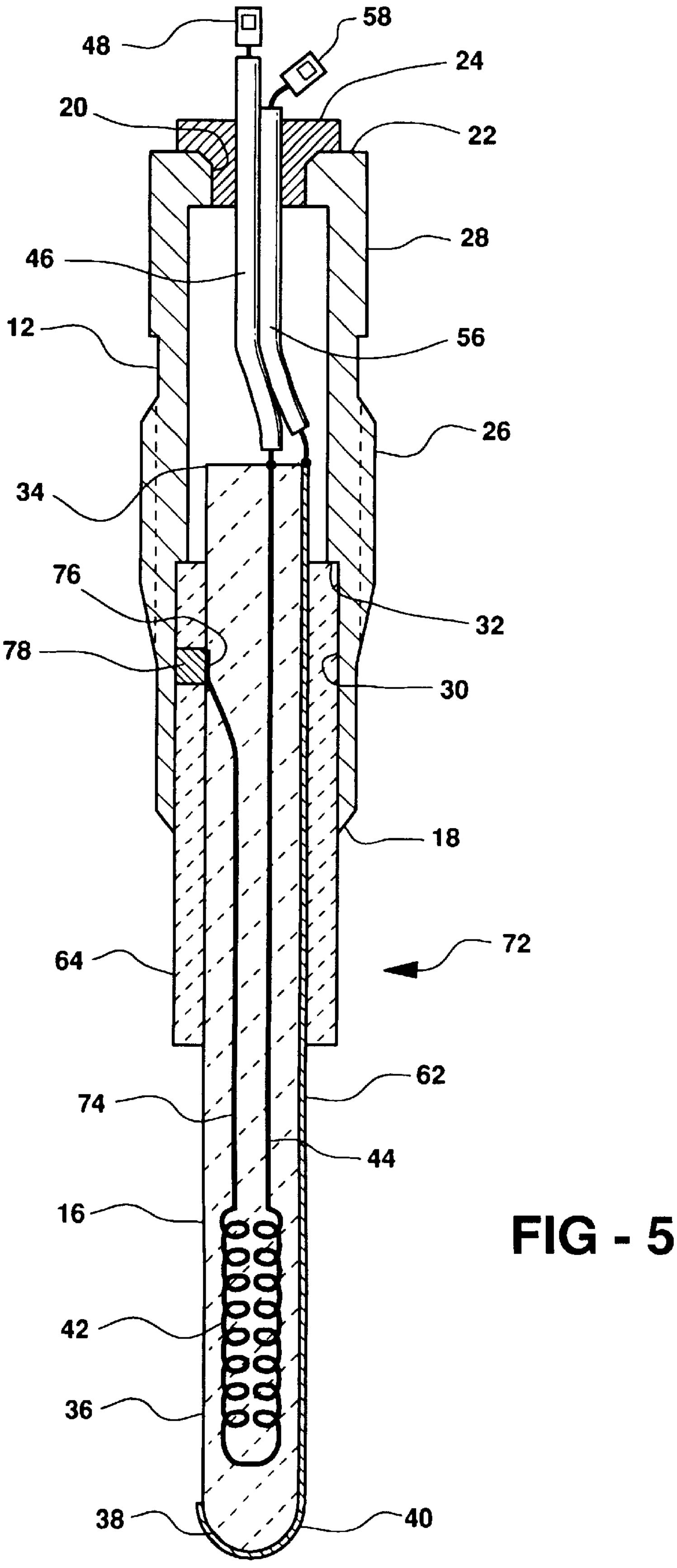

Referring now to FIG. 5, there is shown a second alternative embodiment of ceramic glow sensor formed in accordance with the invention and generally indicated by numeral 72. This embodiment is most similar to the previously described embodiment of FIG. 4, so that like numerals are used for like parts. This third embodiment differs, in that, in a manner similar to the first embodiment, a second conductor 74 extends from the heating element 42 through the ceramic rod 16 to a terminus 76 at one side of the ceramic rod within the ceramic sleeve 64 and the externally surrounding shell 12. An opening provided in the sleeve is filled with electrically conductive material such as a metal braze 78 which connects the second conductor 74 with the metal shell 12 through the ceramic sleeve 64 to provide the necessary ground connection from the second conductor 74 of the heater 42 to the engine cylinder head in which the sleeve is installed. Since other aspects of the construction of the third embodiment of FIG. 5 are similar to those of the previously described embodiments, further discussion is believed unnecessary.

As used in the claims, the term "combustion chamber" is intended to include a pre-chamber or precombustion chamber within its scope.

While the invention has been described by reference to certain preferred embodiments, it should be understood that numerous changes could be made within the spirit and scope of the inventive concepts described. Accordingly it is intended that the invention not be limited to the disclosed embodiments, but that it have the full scope permitted by the language of the following claims.

What is claimed is:

1. A glow sensor for use in a combustion chamber of a diesel engine, said glow sensor comprising:

a tubular metal shell including mounting means for mounting the glow sensor in a chamber defining component of the engine;

a ceramic support sleeve carried in the shell;

a ceramic rod carried by the support sleeve and having an outer end terminating within the shell and isolated therefrom by the sleeve, and an inner end forming a glow tip extending inwardly beyond the shell and sleeve for extension into an associated combustion chamber;

a heating element within the glow tip and connected with first and second electrical conductors within the ceramic rod for providing electric current to the heating element;

an electrically conductive layer on the glow tip and connected with a third electrical conductor for providing an electrical voltage to the conductive layer; and connecting means for connecting said conductors to electrical sources exterior to the glow sensor.

2. A glow sensor as in claim 1 wherein said third conductor is also within the ceramic rod.

3. A glow sensor as in claim 2 wherein said first and third conductors are connected within said shell at said outer end of the ceramic rod with insulated leads extending through a sealed opening in the shell to external terminals connectable with electric voltage sources and said second conductor is grounded through said sleeve to said shell.

4. A glow sensor as in claim 1 wherein said third conductor is carried on the exterior of the ceramic rod.

5. A glow sensor as in claim 4 wherein said first and third conductors are connected within said shell at said outer end of the ceramic rod with insulated leads extending through a sealed opening in the shell to external terminals connectable with electric voltage sources and said second conductor is grounded through said sleeve to said shell.

6. A glow sensor as in claim 4 wherein said first, second and third conductors are connected within said shell at said one end of the ceramic rod with insulated leads extending through a sealed opening in the shell to external terminals connectable with electric voltage or ground sources.

7. A glow sensor as in claim 2, wherein said conductive layer is formed of a conductive material resistant to oxidation at high temperatures and said third conductor is formed of a material subject to oxidation at high temperatures in an oxidizing atmosphere of a combustion chamber, said third conductor being protected from oxidation by location within the ceramic rod.

8. A glow sensor as in claim 7, wherein the third conductor is connected with the conductive layer by a short length of an oxidation resistant material extending within the glow tip to maintain the third conductor spaced away from the surface of the glow tip and the surrounding oxidizing atmosphere in a combustion chamber.

9. A glow sensor as in claim 7, wherein the material of the third conductor is tungsten and the material of the conductive layer is one of platinum and palladium.

10. A glow sensor as in claim 5, wherein the second conductor is electrically connected with the shell by braze material extending through an opening in the sleeve.

* * * * *